UNITED STATES PATENT OFFICE.

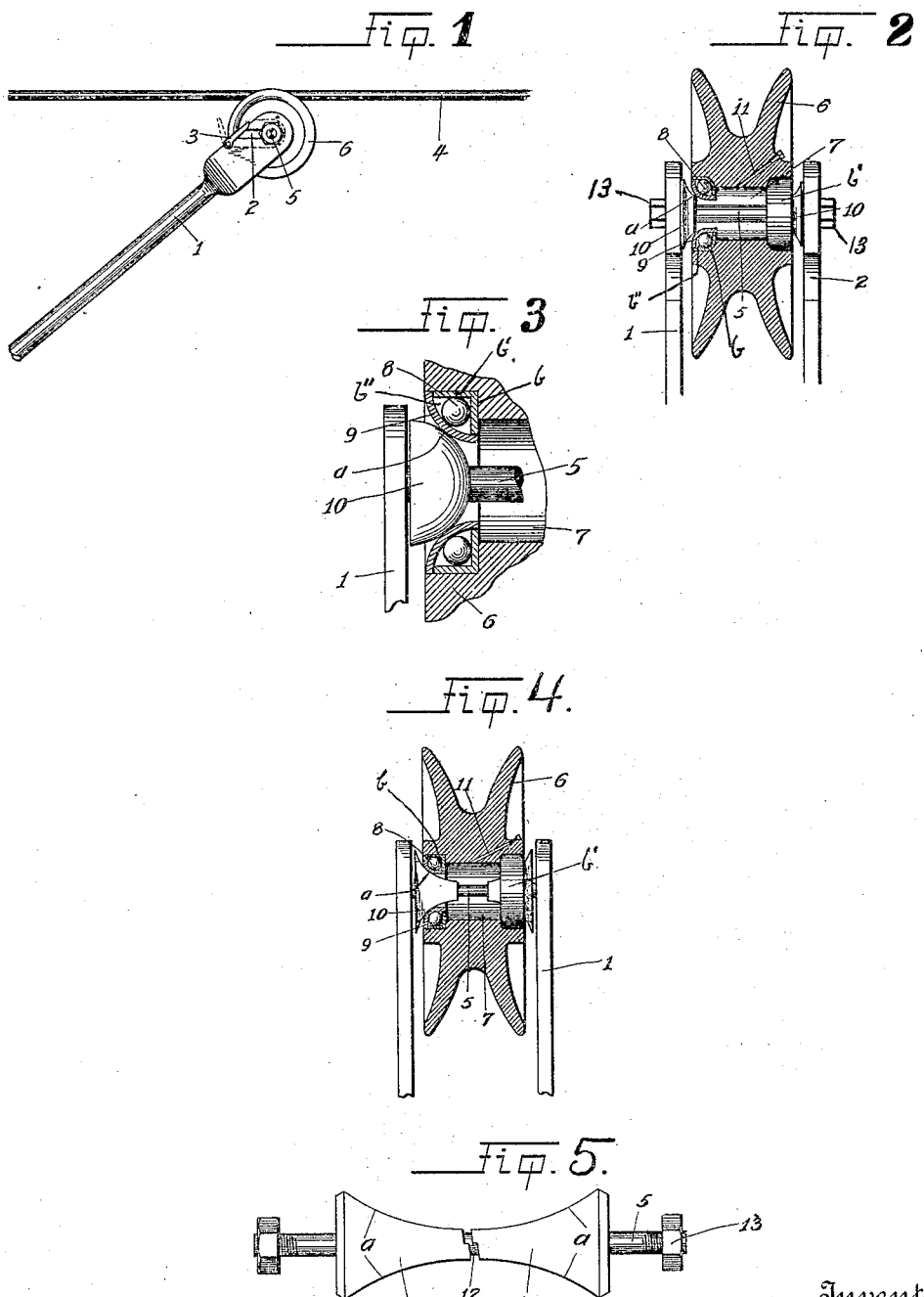

WILLIAM H. ARNOLD, OF OAKLAND, CALIFORNIA.

WHEEL-BEARING.

946,891.  Specification of Letters Patent.  Patented Jan. 18, 1910.

Application filed March 15, 1907. Serial No. 362,561.

*To all whom it may concern:*

Be it known that I, WILLIAM H. ARNOLD, a citizen of the United States, residing at Oakland, in the county of Alameda and State of California, have invented certain new and useful Improvements in Wheel-Bearings; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in wheel bearings, the object being to produce a wheel bearing by means of which the wheel when rotating will have perfect freedom of motion. This object I accomplish by means of a ball bearing surface within the wheel, pivotally mounted on a bearing cone to obtain a continuous bearing surface, and by such other details of construction as will hereinafter appear in the description.

In the drawing, similar reference characters indicate corresponding parts in the several views, in which:—

Figure 1 is a side elevation of the trolley wheel equipped with my improved wheel bearing, showing the trolley wheel in engagement with a conducting wire. Fig. 2 is a vertical sectional view through the wheel, showing the preferred form of bearing. Fig. 3 is the fragmentary section, showing but one bearing, and having a reversed cone arrangement. Fig. 4 is a vertical sectional view of the wheel showing a further modified form of cone. Fig. 5 is a plan view of another modification of the cone bearings, showing the same mounted on the axle.

Referring in detail to the drawings, 1 designates a trolley pole having an integral bifurcated head, forming side arms which are provided with diagonal slots 2 to receive the axle 5, said slots being normally closed at their outer ends by means of guards 3, which prevent a trolley wire 4, or other objects from catching in the slots. The axle 5 is held against longitudinal shifting by nuts 13 on the ends thereof.

The reference numeral 6 designates the trolley wheel, provided with a central bore 7 of materially greater diameter than the diameter of the axle 5. The said wheel is provided in its opposite side faces at the ends of the bore, with annular recesses $b$, in which is received ball receiving members $b'$, which are angular in cross section, and one of the flanges of which projects over the ends of the wheel bore, as best seen in Fig. 3 of the drawings. The outer edges of the flanges of these ball receiving members are engaged by a second set of ball receiving members 9, which are concavo-convex in cross section, the convex surfaces of which are engaged by the conical bearing members 10 carried by axle 5.

The ball receiving members $b'$ and 9 form, when arranged in relation to each other as best shown in Fig. 3, a ball race $b''$ to receive anti-friction balls 8.

The ball receiving members 9 contact with the conical bearing members only at a single point $a$, whether the conical bearing members have their concave faces in engagement with the ball receiving members in accordance with the construction shown in Figs. 2, 4 and 5, or are arranged in inverted form as shown in Fig. 3, wherein the convex faces of the bearing members are exposed to the ball receiving members 9.

It is preferable to provide the trolley wheel with an oil inlet port 11 leading into the bore 7, so that this bore may be kept filled with a suitable lubricant, the port 11 being suitably closed after the filling operation so as to prevent loss of the lubricant.

In the modification shown in Fig. 5 the cones or bearing members are arranged on the axle 5 so that their concave faces are outward, the inner ends of said bearing members having interlocking shoulders 12, so as to insure simultaneous movement of the bearing members.

While I have shown and described my invention in connection with a trolley wheel, it will, of course, be understood, that the bearing shown and described is applicable for use in connection with wheels of various types.

Having thus described my invention, what I claim as new and useful and desire to secure by Letters Patent is:—

In a wheel bearing, an axle support, an axle mounted in said support, a wheel having a bore receiving said axle, said bore of materially greater diameter than the axle whereby the walls of the wheel bore are free from engagement with the axle, the said wheel being provided in its opposite side faces at the ends of the bore with annular recesses of greater diameter than the bore, antifriction-ball-receiving members of angular cross section seated in said recesses with one of the flanges thereof projecting over the ends of the wheel bore, annular ball-receiving members of concavo-convex cross section fitted to engage the free edges of the flanges of the first mentioned ball-receiving members, antifriction balls between said members, and bearing-members surrounding the axle between the concavo-convex ball-receiving members and the axle support, the curved exterior faces of said bearing-members engaging the convex faces of the concavo-convex ball-receiving members.

In testimony whereof I affix my signature in presence of two witnesses.

WILLIAM H. ARNOLD.

Witnesses:
PERCY S. WEBSTER,
FRANK H. CARTER.